US012650360B2

(12) United States Patent
Banchik et al.

(10) Patent No.: US 12,650,360 B2
(45) Date of Patent: Jun. 9, 2026

(54) BEAM MEASURING DEVICE

(71) Applicant: Innova Transportation, LLC, Las Vegas, NV (US)

(72) Inventors: Carlos Banchik, Las Vegas, NV (US); Peter Timan, Kingston (CA); Marwan Zayed, Las Vegas, NV (US); Daniel Konevky, Las Vegas, NV (US); Farghal Maree, Las Vegas, NV (US); Lucas Bernardi, Sao Paulo (BR); Robert Naples, Las Vegas, NV (US)

(73) Assignee: INNOVA TRANSPORTATION, LLC, Las Vegas, NV (US)

( * ) Notice: Subject to any disclaimer, the term of this patent is extended or adjusted under 35 U.S.C. 154(b) by 288 days.

(21) Appl. No.: 18/521,506

(22) Filed: Nov. 28, 2023

(65) Prior Publication Data

US 2024/0230457 A1 Jul. 11, 2024

Related U.S. Application Data

(63) Continuation-in-part of application No. 17/909,682, filed as application No. PCT/US2021/021700 on Mar. 10, 2021.

(Continued)

(51) Int. Cl.
| | |
|---|---|
| *G01M 5/00* | (2006.01) |
| *B61B 5/00* | (2006.01) |
| *B61B 13/04* | (2006.01) |
| *B61K 9/10* | (2006.01) |
| *G01B 11/04* | (2006.01) |

(52) U.S. Cl.
CPC ............. *G01M 5/0058* (2013.01); *B61B 5/00* (2013.01); *B61B 13/04* (2013.01); *B61K 9/10* (2013.01); *G01B 11/04* (2013.01)

(58) Field of Classification Search
CPC ....... G01B 11/02; G01B 11/04; G01B 11/043; G01B 11/046; G01M 5/0058; B61B 5/00; B61B 13/04; B61K 9/08
See application file for complete search history.

(56) References Cited

U.S. PATENT DOCUMENTS

| | | | |
|---|---|---|---|
| 2,103,868 A | 12/1937 | Perry | |
| 3,659,345 A | 5/1972 | Franz et al. | |

(Continued)

FOREIGN PATENT DOCUMENTS

| | | |
|---|---|---|
| CN | 203729166 U | 7/2014 |
| CN | 106758602 A | 5/2017 |

(Continued)

OTHER PUBLICATIONS

Action dated May 21, 2025; U.S. Appl. No. 17/909,682, filed Sep. 6, 2022. 12 pages.

*Primary Examiner* — Benjamin R Schmitt
(74) *Attorney, Agent, or Firm* — McDonald Hopkins LLC; James P. Muraff

(57) ABSTRACT
A beam measuring device for measuring a monorail guide beam is disclosed. The beam measuring device includes a frame comprising a trolley adapted to traverse along a monorail guide beam and an instrumentation structure supported by the trolley and adapted to carry measuring instrumentation substantially isolated from vibration induced on the trolley by the beam as the trolley traverses the monorail guide beam.

20 Claims, 14 Drawing Sheets

Related U.S. Application Data

(60) Provisional application No. 62/988,342, filed on Mar. 11, 2020.

(56) References Cited

U.S. PATENT DOCUMENTS

| | | |
|---|---|---|
| 4,487,071 A | 12/1984 | Pagano et al. |
| 4,495,635 A | 1/1985 | Dobbs |
| 5,351,621 A | 10/1994 | Tanaka et al. |
| 5,745,237 A | 4/1998 | Yahiro et al. |
| 2009/0266268 A1 | 10/2009 | Timan et al. |
| 2018/0339720 A1 | 11/2018 | Singh |

FOREIGN PATENT DOCUMENTS

| | | | | | |
|---|---|---|---|---|---|
| CN | 107235049 A | * | 10/2017 | ............... | B61F 5/50 |
| CN | 107653775 A | | 2/2018 | | |
| CN | 207878197 U | | 9/2018 | | |
| CN | 208021460 U | * | 10/2018 | ............ | B61D 15/12 |
| CN | 110500955 A | | 11/2019 | | |
| CN | 111551127 A | | 8/2020 | | |
| GB | 1058774 A | | 2/1967 | | |
| JP | h0749958 A | | 2/1995 | | |
| JP | 2742493 B2 | | 4/1998 | | |
| JP | 4901704 B2 | | 11/2007 | | |
| JP | 6438691 B2 | | 12/2018 | | |
| KR | 101424774 B1 | | 8/2014 | | |
| KR | 101468172 B1 | * | 12/2014 | ............. | B61K 9/08 |
| WO | 9524610 A1 | | 9/1995 | | |
| WO | WO-2015006232 A1 | * | 1/2015 | ............. | G05D 1/02 |
| WO | 2015170879 A1 | | 11/2015 | | |
| WO | 2016129795 A1 | | 8/2016 | | |

* cited by examiner

Optimal Condition
There is a relation between the side
and top readings

Rotated Condition
There is a relation between the
side and top readings

Top not Flat Condition
There is unbalance between the
sides and the top

Sides not Parallel Condition
There is unbalance between the
sides and the top

BEAM MEASURING DEVICE

BACKGROUND

Straddle beam monorail cars traveling over monorail tracks are known. See for example U.S. Pat. Nos. 7,823,512; 7,963,229; and 8,707,870. A series of monorail cars, when sequentially assembled together as a unit, are collectively referred to as a monorail car assembly, or monorail car consist.

As disclosed in the above patents, such monorail car assemblies may be supported on monorail bogies. Monorail bogies travel along monorail guide beams that support and guide them. See for example U.S. Pat. No. 7,823,512, illustrating a representative guide beam, or monorail track 16, having a generally horizontal (i.e., top) running surface 18 and two, opposed, generally parallel, side (a/k/a guiding or stabilizing) surfaces 20.

Guide beams may be made of steel or concrete cast-in-situ, or precast. As is known in the art, it is important that geometric shapes of the guide beams are correctly retained, such as squareness between the top and side surfaces, width, and parallelism between the side surfaces of the guide beam to be consistent within a predetermined tolerance. Each of the running surfaces must be in correct profile to a predetermined tolerance over a given distance along the length of the beam as determined by the train manufacturer, such as +/−3 mm over any 3 m distance, etc. Also, it is important to have correct surface texture (top surface texture for safe adhesion) (side surface texture for minimal wear/noise etc.).

When a monorail car assembly travels through a curve in the track, the car assembly is exposed to centrifugal forces. Accordingly, the track may be installed with slight angles, such that the top and side surfaces of the track present a super-elevation angle relative to the horizontal plane, to counter the centrifugal force. It is also important to measure the super-elevation angle of the track after it has been installed, to ensure the super-elevation angle is appropriate and matches design values and industry tolerances including a rate of change of curvature [spiral] and a rate of change of super-elevation.

While various methods have been utilized for measuring width and parallelism between the side surfaces, squareness between the top and side surfaces, profile along the length of the running surfaces and the super-elevation angles, such methods are difficult to perform, and their results have been inconsistent and difficult to replicate. Historically measurements have been limited and cannot provide a true picture of the beam quality either in the as-built or deteriorated condition over time.

The present invention is provided to address these and other problems.

SUMMARY

It is an object of the present disclosure to provide a beam measuring device (or BMD) for measuring specific, important geometric characteristics of monorail guide beams.

This and other objectives and advantages may become apparent from the following description taken in conjunction with the accompanying Figures.

DESCRIPTION OF PREFERRED EMBODIMENTS

This invention is susceptible of embodiment in many different forms. Specific embodiments will be described herein in detail, with the understanding that the present disclosure is to be considered an exemplification of the principles of the invention and is not intended to limit the invention to the specific embodiments illustrated.

Figure 1:
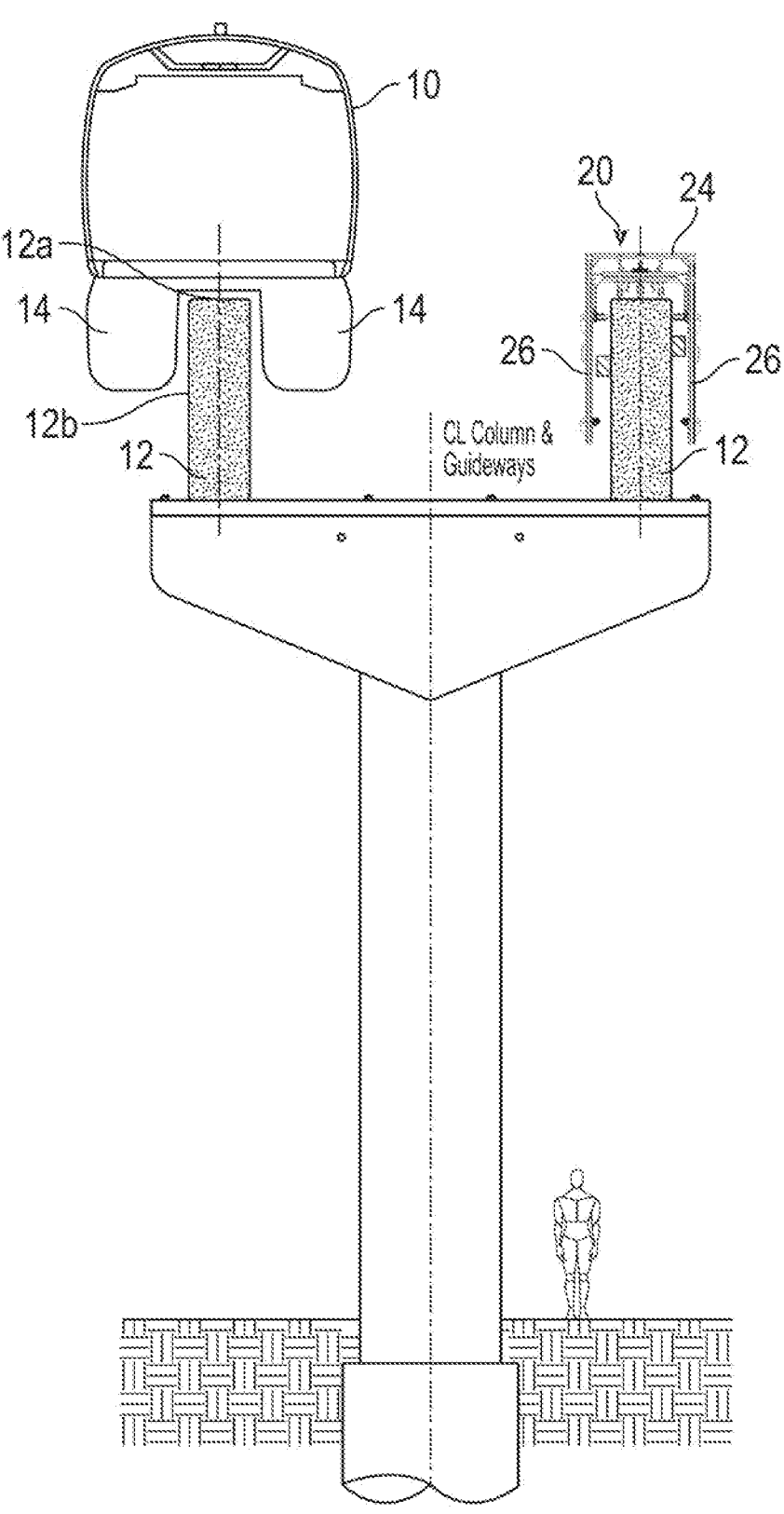
FIG. 1 is a sectional view of a monorail car, and one embodiment of a beam measuring device in accordance with the present invention, each shown disposed on a respective monorail track, with the monorail tracks supported on a column.
Figures 2, 3:
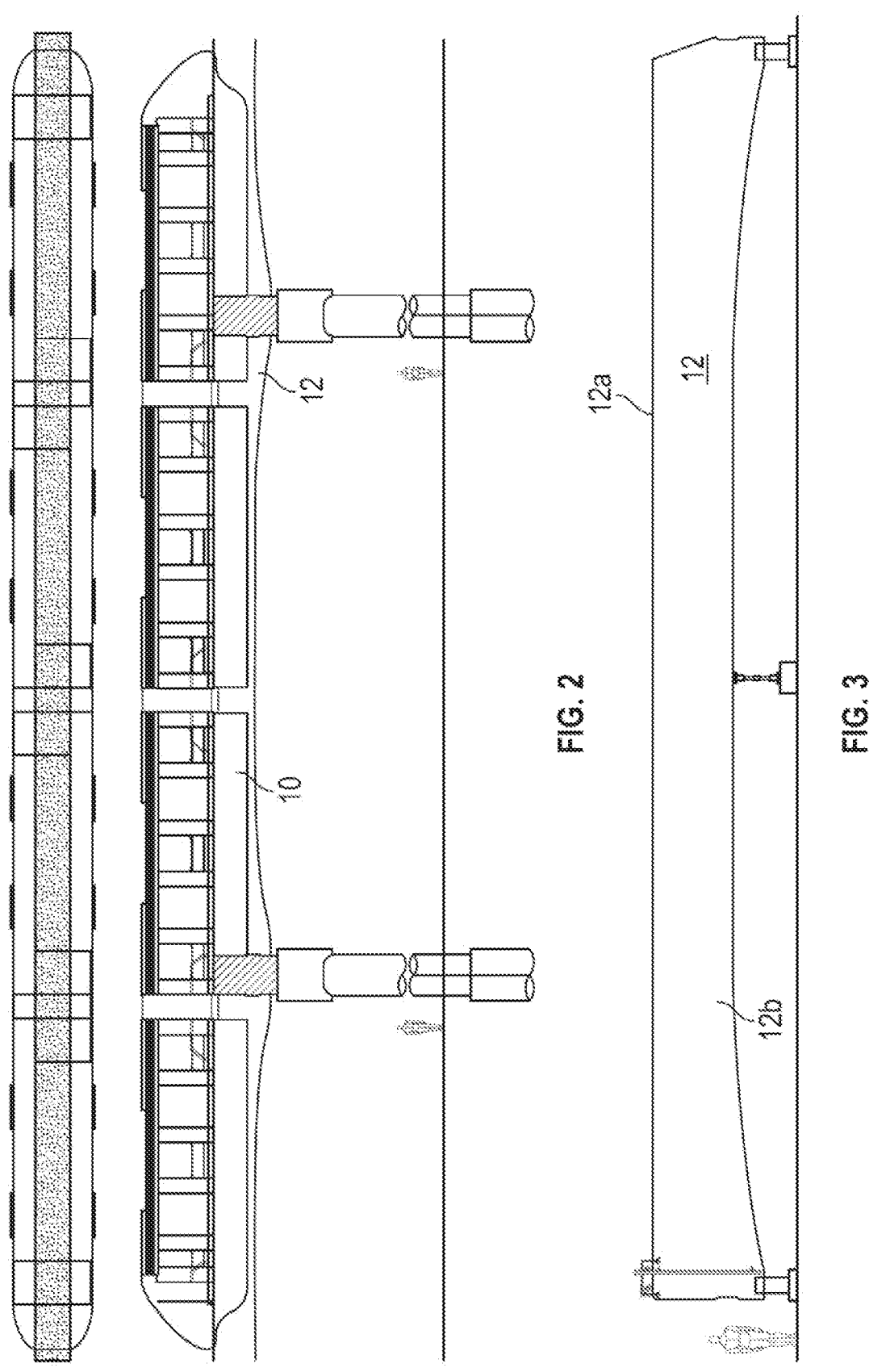
FIG. 2 is a plan and elevation view of a monorail car assembly disposed on a monorail track (the individual is illustrated dimensionally proportional)
FIG. 3 is an elevation view of a typical guide precast concrete beam in a precast yard. The beams so cast are later transported, lifted and secured over columns to provide the track for the monorail assembly (the individual is illustrated dimensionally proportional)

A monorail car, generally designated 10, disposed on a guide beam 12, is illustrated in FIG. 1. A monorail car assembly comprising a plurality of the monorail cars 10, disposed on the guide beam 12 is illustrated in FIG. 2.

The beam 12 may be operative as a conventional monorail track. The beam 12 may be formed of precast concrete, or other suitable material, as is known. The beam 12 may include a generally horizontal running surface 12a, and two, opposed, parallel, side, or stabilizing, surfaces, 12b.

The monorail car 10 may include two bogies 14, which may each be a conventional straddle beam bogie (not shown). Each of the bogies 14 may include at least one load-bearing wheel (not shown) having a generally horizontal axis of rotation. Each of the bogies 14 may include two opposing sets of two guide wheels, as well as two or more opposing stabilizing wheels (also not shown), the guide wheels and stabilizing wheels having a generally vertical axis of rotation. Typically, the guide wheels engage the respective side surfaces 12b, along a common guide wheel path. Typically, the opposing stabilizing wheels also engage the respective side surfaces 12b, but along a stabilizing wheel path vertically below the guide wheel path engaged by the guide wheels. A more detailed description of a bogie may be found in the above-referenced US patents.

As discussed above, it is important that the distance between the opposing side surfaces 12b remain within a tolerance, such as +/−3 mm. This tolerance is of particular importance along the side surfaces 12b of the beam 12 where the guide wheels engage the side surfaces 12 (i.e., along the guide wheel path) and where the stabilizing wheels engage the side surfaces 12b (i.e., along the stabilizing wheel path). As also discussed above, the super-elevation angle, squareness and parallelism of the running surface 12a and side surfaces 12b must also be correct within given tolerances along the track, in addition to surface texture and profile along the length of the beam for top and side running surfaces.

First Embodiment

As illustrated in greater detail in FIGS. 4-7, a first embodiment of a beam measuring device 20, in accordance with the present invention, may comprise a generally rigid frame having a generally horizontal frame portion 24, and two, spaced, opposed, generally vertical frame portions 26 supported from the generally horizontal frame portion 24.

Elements of the generally horizontal frame portion 24 may collectively include at least two (three are illustrated), generally planar upper rollers, or casters, 28, adapted to set on the horizontal running surface 12a.

Elements of each of the opposed, generally vertical frame portions 26 may include at least two sets of opposing side rollers/casters 30 and may include at least one set of opposing lower side stabilizing rollers/casters 31 (see below with respect to the second embodiment). The side rollers/casters 30 and the side stabilizing rollers/casters 31, respectively, on at least one side of the frame may be spring loaded or similarly able to accommodate variation in beam width, such as comprising at least one pneumatic tire, without excessive loading of the guide and stabilizing tires so as to maintain engagement of the rollers/casters 30, 31 with their respective side surfaces 12b at all times. These preloads applied to the side rollers 30, 31 may be adjusted by adjusting the vertical members and/or by adjusting the side rollers laterally, or by adjusting the pressure of the pneumatic tire, if utilized.

Figures 6, 7:
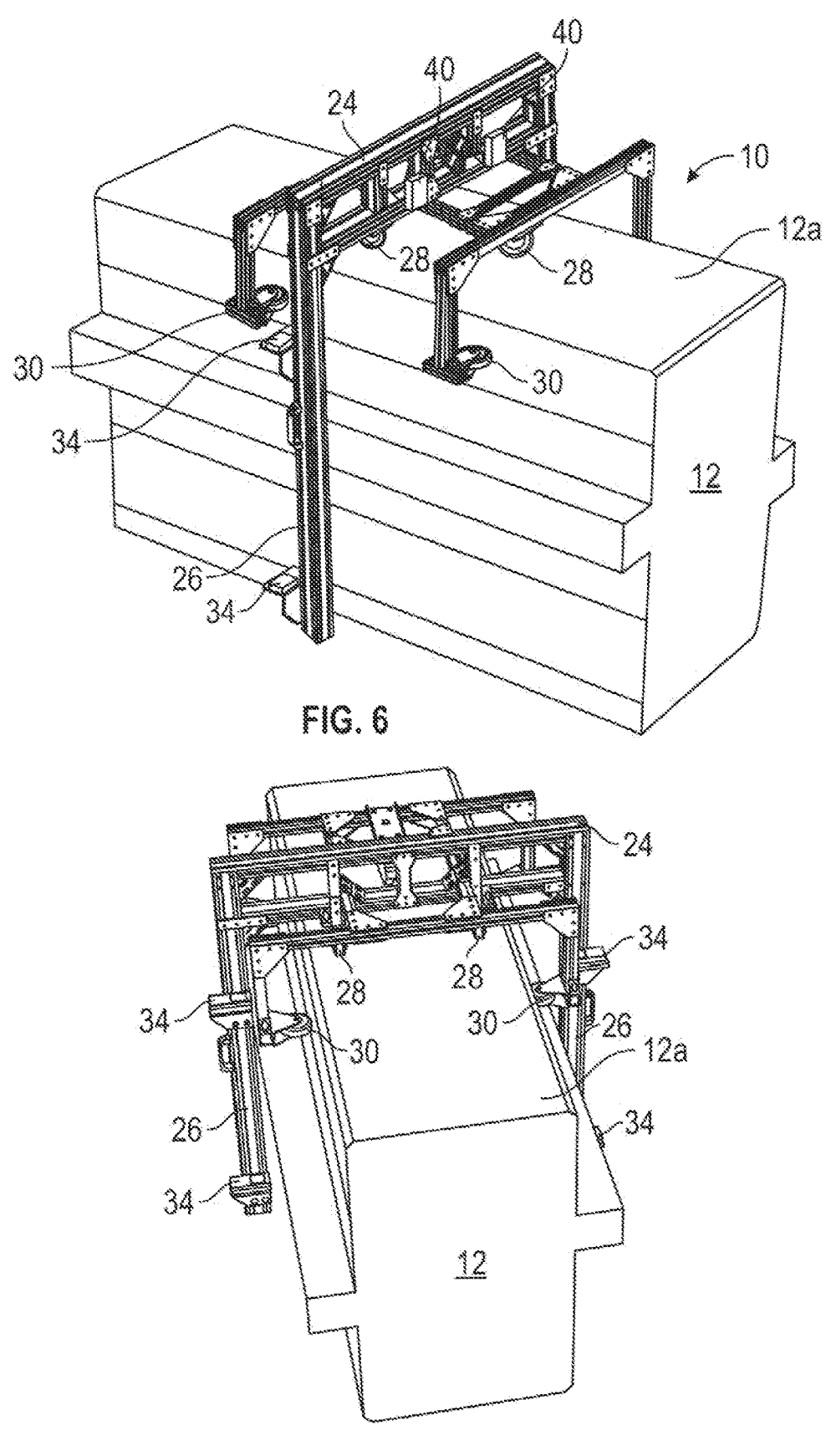
FIGS. 6 and 7 are each isometric views of the beam measuring device of FIG. 4, disposed about a beam to be measured.
Figure 8A:
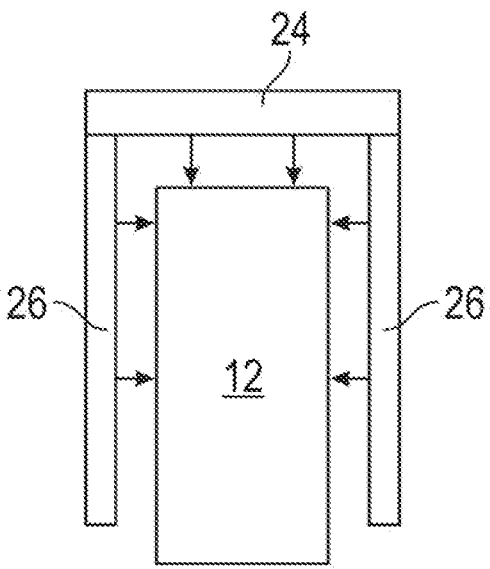
FIGS. 8A-8D illustrate how the beam measuring device of FIG. 4 may measure various dimensions of a beam, such as a guide beam.
Figure 8B:
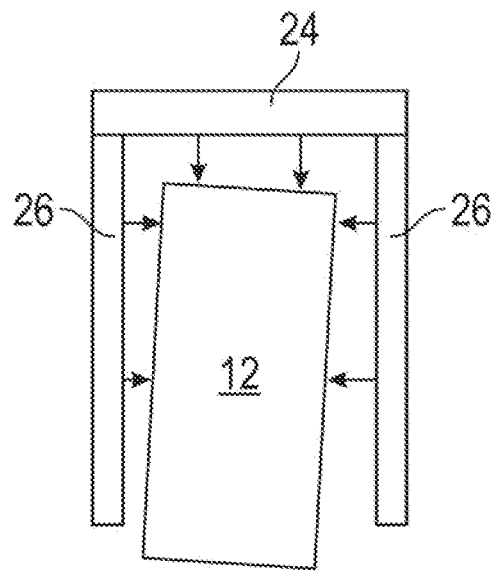
Figure 8C:
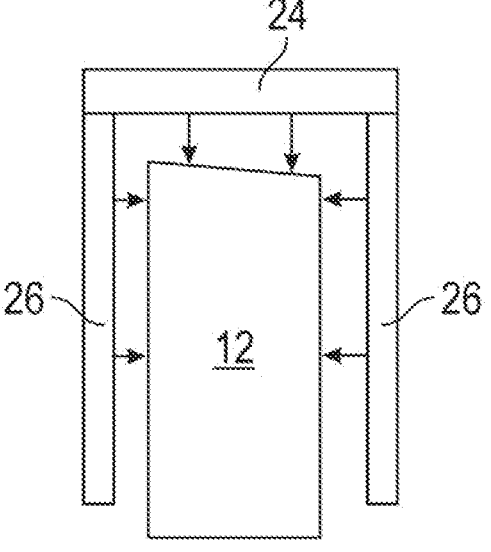
Figure 8D:
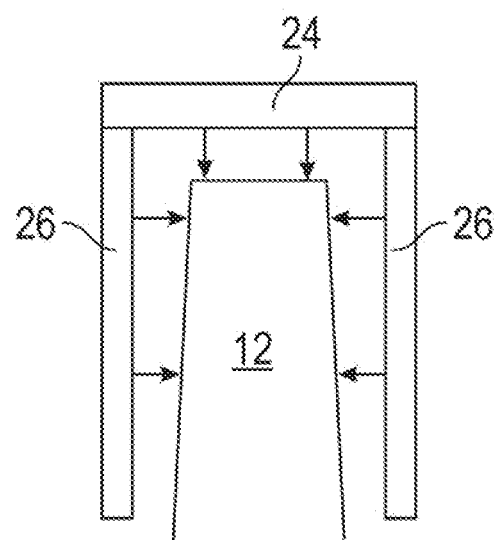
Figure 10:
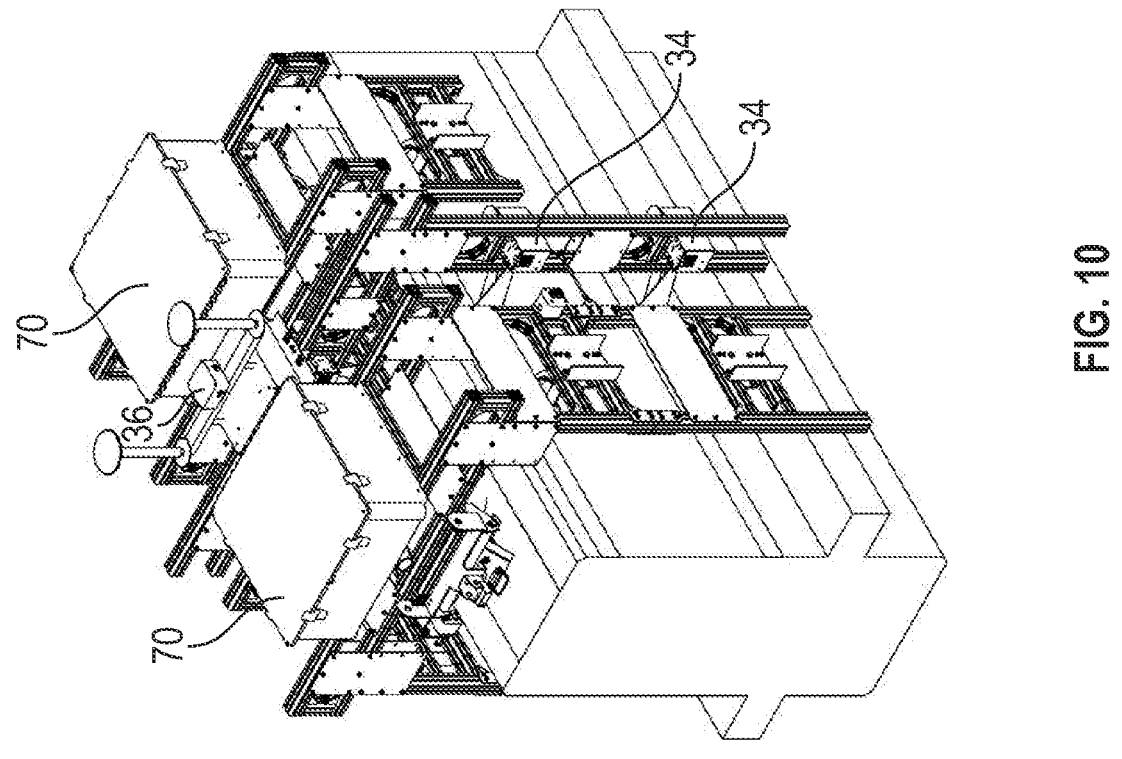
FIG. 10 is a perspective view of the second embodiment of the present invention, shown straddling a 660 mm wide monorail beam, such as utilized on the Las Vegas Monorail, Las Vegas NV, USA.
Figure 9:
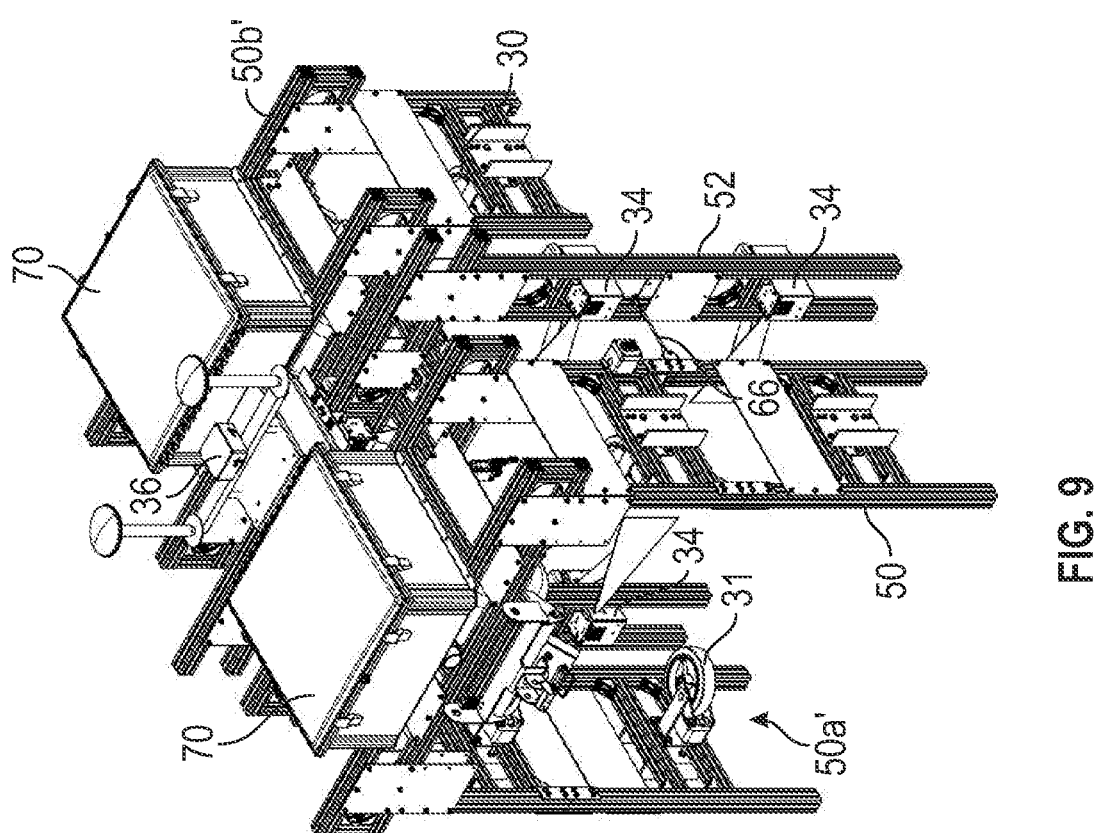
FIG. 9 is a perspective view of a second embodiment of the present invention.

As illustrated in FIGS. 1, 6 and 7, the beam measuring device 20 may be positioned on a guide beam 12 to be measured, such that the upper rollers 28 may engage the horizontal running surface 12a of the beam 12, such that the beam measuring device 20 follows the running surface 12a of the beam 12, and the side rollers 30, adjust to follow the respective side surfaces 12b.

The beam measuring device 20 may be positioned on a beam to be measured, either after the beam 12 has been installed, as shown in FIG. 1, or prior to installation, as shown in FIG. 3.

The beam measuring device 20 may include at least two side distance measuring devices, or meters, 34, disposed on each vertical frame portion 26, such that each of the side distance meters 34 disposed on one side is aligned with a respective side distance meter 34 disposed on the other, opposite side, such that the width of the beam 12 (at the location of the beam 12 between the two opposed side distance meters 34) may be accurately measured. As the beam measuring device 20 traverses along the guide beam, measurements may be continuously taken.

The beam measuring device 20 may also include two upper distance meters 40 disposed on the horizontal frame portion 24. The upper distance meters 40 may measure vertical distances to the beam 12.

The side and upper distance meters 34, 40, respectively, may utilize various technologies for measuring the distance between the respective meter and the beam 12, as well as determining the profile of the running surface. One such meter may be of the ToughSonic Level and Distance Sensor line, by Senix Corporation, Hinesburg VT. The ToughSonic Level and Distance Sensor line utilizes ultrasound to measure distances.

Another such meter may be a laser-based device, such as a Gocator laser profilometer, or similar device, by LMI Technologies, Vancouver Canada. The Gocator profilometers utilize lasers to measure distances and surface profile and texture. Such laser profilometers may be integrated with tri-axial accelerometers to accurately determine positioning and longitudinal profile data in combination with GPS.

Figure 4:
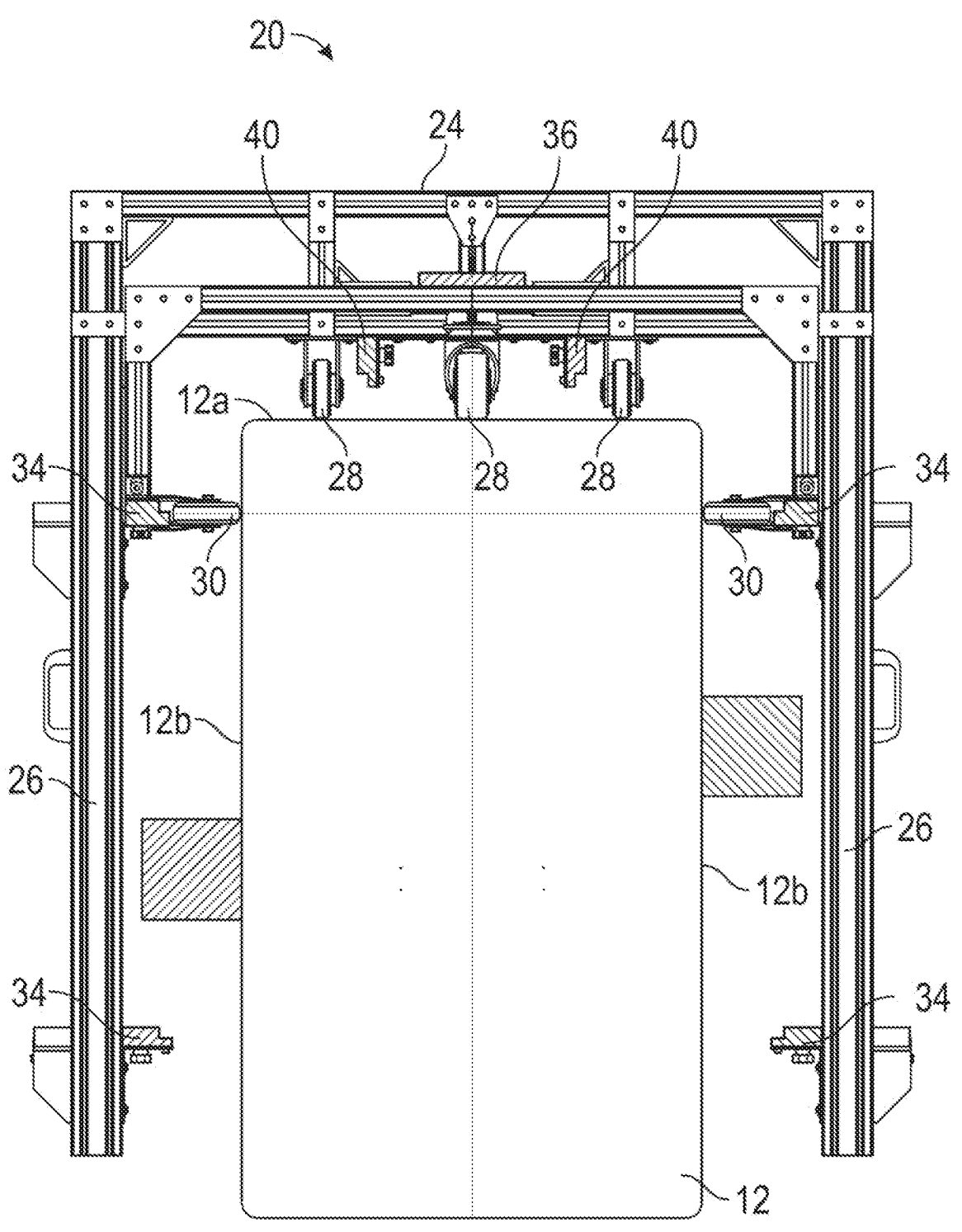
FIG. 4 is a sectional view of one embodiment of the beam measuring device according to the present invention.
Figures 5, 5A:
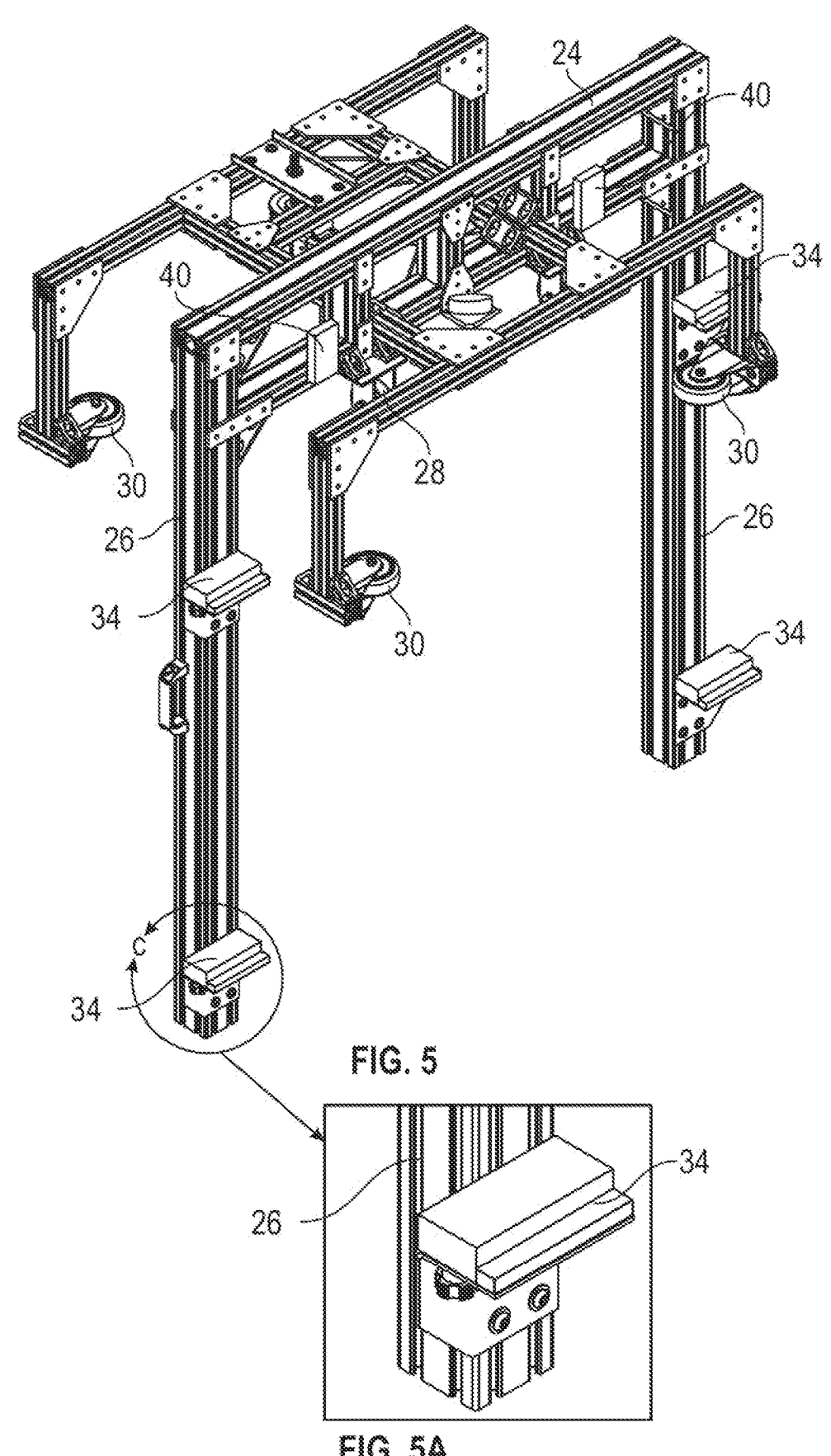
FIG. 5 is an isometric view of the beam measuring device of FIG. 4.
FIG. 5A is a detail view (Detail C) of a distance sensor of the beam measuring device of FIG. 4, taken within circle "C" of FIG. 5.

Referring to FIG. 4, the beam measuring device 20 may include an inertial measuring unit (IMU) 36 which may include an inclinometer and an accelerometer. The IMU 36 may be positioned on the horizontal frame portion 24. The inclinometer may be a dual-axis inclinometer or a tri-axial inclinometer. The IMU 36 may be provided by Surface Systems & Instruments, Inc., of Auburn, C A, and Manhattan, KS.

Similarly, the accelerometer may be a dual-axis accelerometer or a tri-axial accelerometer. The inclinometer in conjunction with the accelerometers and the distance meters 34, 40 and the GPS and/or base station data, when the beam measuring device 20 is traversing along an installed beam, may measure the transverse super-elevation and longitudinal grade of the track, as well as track alignment.

The IMU 36 may be integrated as a part of an Inertial Navigation System (INS). The INS may provide geographical positioning data via antennas and GPS base stations and/or Global Navigation Satellite System (GNSS)/GPS data.

The IMU 36 may include software used to trigger, capture and save data collected by the lasers and accelerometers. Point-to-point profile data from the lasers and accelerometers may be used to report misalignments or deviations relative to a plane, similar to a straightedge analysis. The mounting frame may be assumed to be rigid to complete the calculations for beam angularity, beam dimensions and torsion. A summary of component and process is below:

Each of the lasers 34, 40 may be synchronized through the IMU 36 and may simultaneously capture data from all of the lasers.

The laser elevation output may be an average of 1280 measurement points. One single elevation measurement is recorded for each sampling interval unless texture is being measured. Elevation measurement may be serial; texture and angle may be ethernet The lasers may have a 100 or 150 mm width depending on the measurement type.

100 mm wide lasers are preferably used if texture data is reported.

Either the 100 mm or 150 mm lasers may report an angle measurement

The laser is preferably calibrated to a level surface.

The sampling Interval may be set through a GPS-DMI or an encoder which may roll on the beam surface. Default sampling interval may be 1-inch.

The encoder may be used during GPS outages.

During data collections, base station(s) may log data to be post-processed with the BMD's GPS-INS data. This post-processed kinematic (or PPK) process may improve the GPS accuracy and the IMU pitch and roll data from the BMD frame.

Analysis for superelevation, torsion, and perpendicularity may be performed with data streams from one or multiple sensors. The data may be collected within the IMU 36 and saved as a data file.

As functionally illustrated and described in FIGS. 8A-8D, the one or more upper distance meters 40 may be integrated with, and may operate in conjunction with, the side distance meters 34, the IMU 36, and INS system to measure various conditions of a preinstalled, or installed, beam 12. The various conditions that can be measured may include geometry of the beam, superelevation, longitudinal profiles of the running surfaces, and the alignment of the beam 12 along with running surface texture.

The measurements obtained by the beam measuring device 20 may allow one to address conditions on (a) the precast yard, i.e., a yard storing uninstalled precast beams, and (b) on the assembled project where the beams will have the proper installation.

The beam measuring device 20 may still further include a marking device, not shown, which may be mounted on the vertical frame portion 26, to mark portions along the guide beam 12, such as marking indicia of the beam's width, or variance from a desired width, or of the track's super-elevation, or variance from a desired super-elevation, as the beam measuring device travels along a track.

The beam measuring device 20 may include an encoder (not shown) coupled to the distance meters 34, 40, and the IMU 36, to progressively sample outputs of the distance meters 34, 40, and the IMU 36, to provide a report detailing the measured distances and super-elevation angle, along the measured beam consistently.

The beam measuring device 20 may include traction motors (not shown) remotely controlled to provide an ability of monitoring guide beam characteristics along a given track alignment.

Second Embodiment

A second embodiment of the beam measuring device 20', or BMD 20', in accordance with the present invention is illustrated in FIGS. 9-23. Common reference numbers of components have been maintained.

Figure 12:
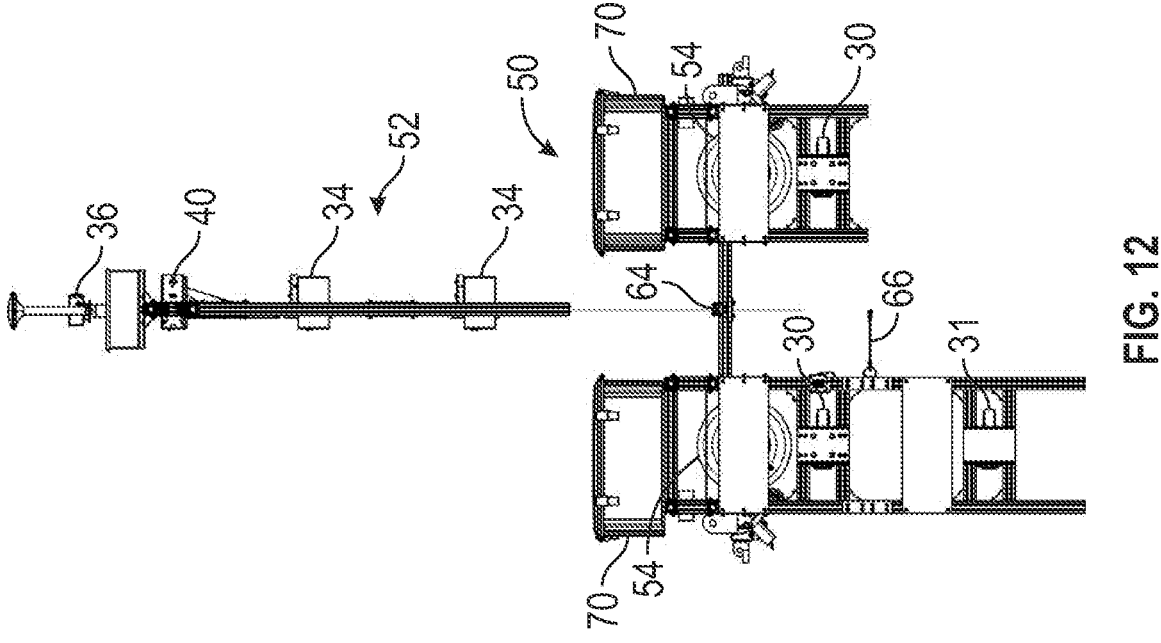
FIG. 12 is an exploded side view of the second embodiment of the present invention, showing the generally inverted u-shaped instrumentation structure separated from the trolley.
Figure 11:
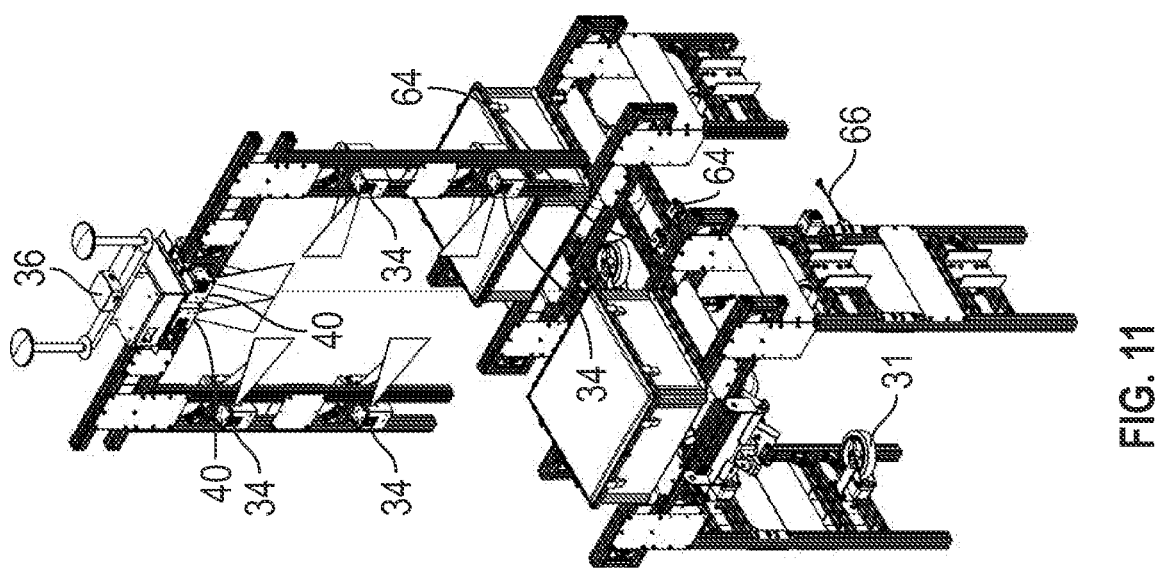
FIG. 11 is an exploded perspective view of the second embodiment of the present invention, showing a generally u-shaped instrumentation structure separated from a trolley.
Figure 14:
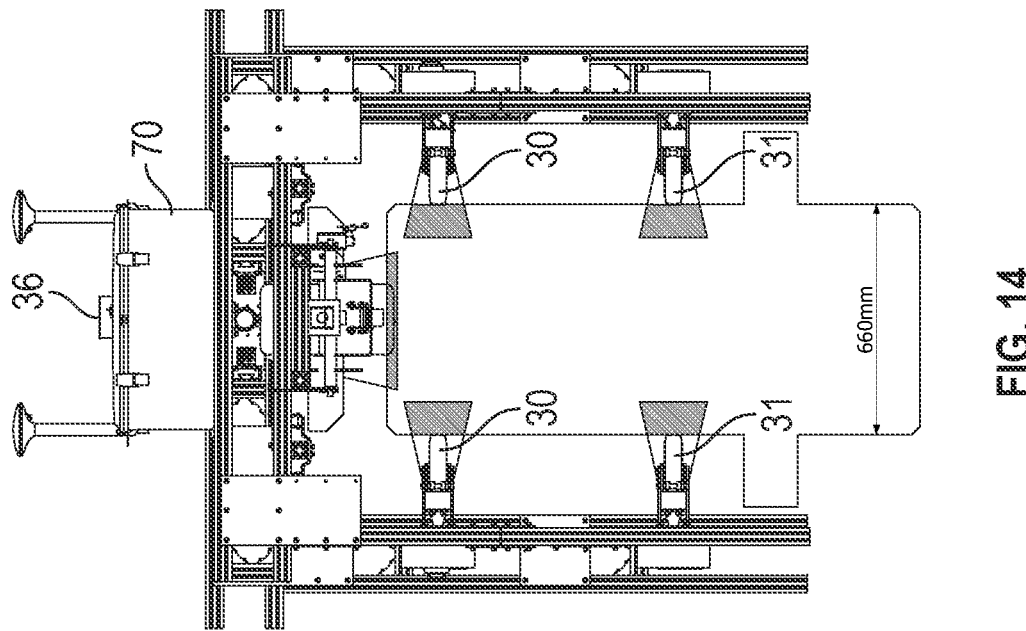
FIG. 14 is a front view of the second embodiment of the present invention, shown straddling the 660 mm wide monorail beam, such as utilized on the Bombardier Monorail System in Las Vegas, Nevada, US (the Las Vegas Monorail)
Figure 13:
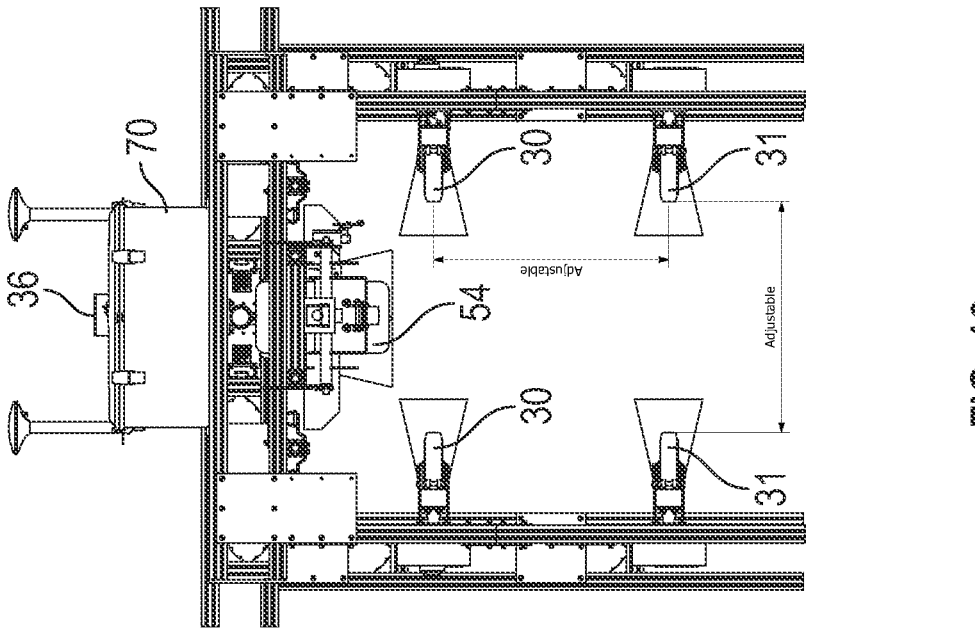
FIG. 13 is a front view of the second embodiment of the present invention.
Figure 16:
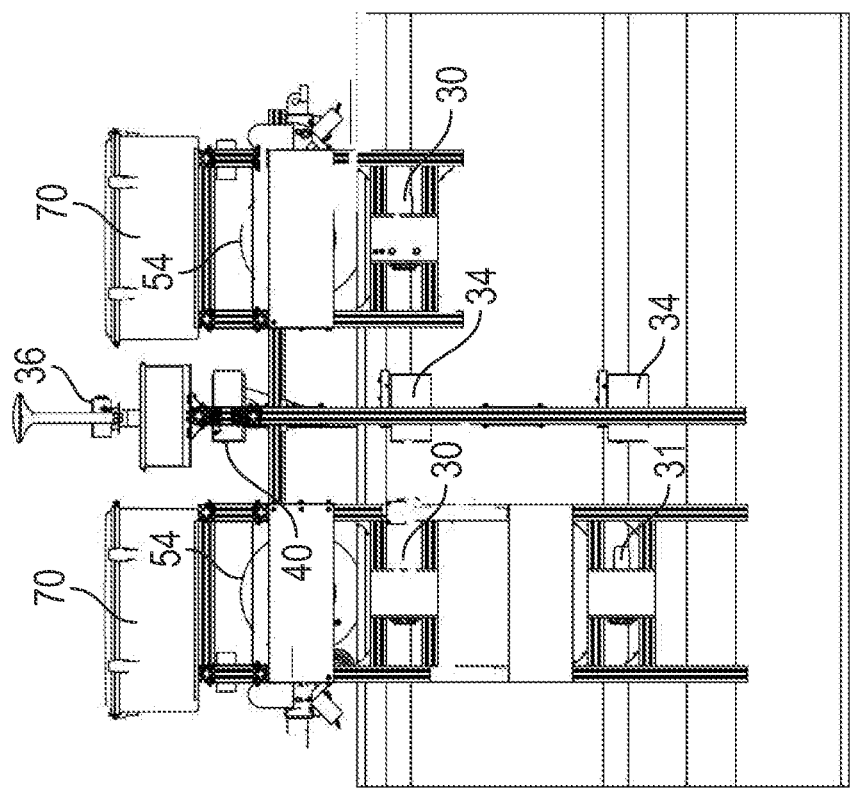
FIG. 16 is a side view of the second embodiment of the present invention, shown straddling the 660 mm wide monorail beam such as utilized on the Las Vegas Monorail.
Figure 15:
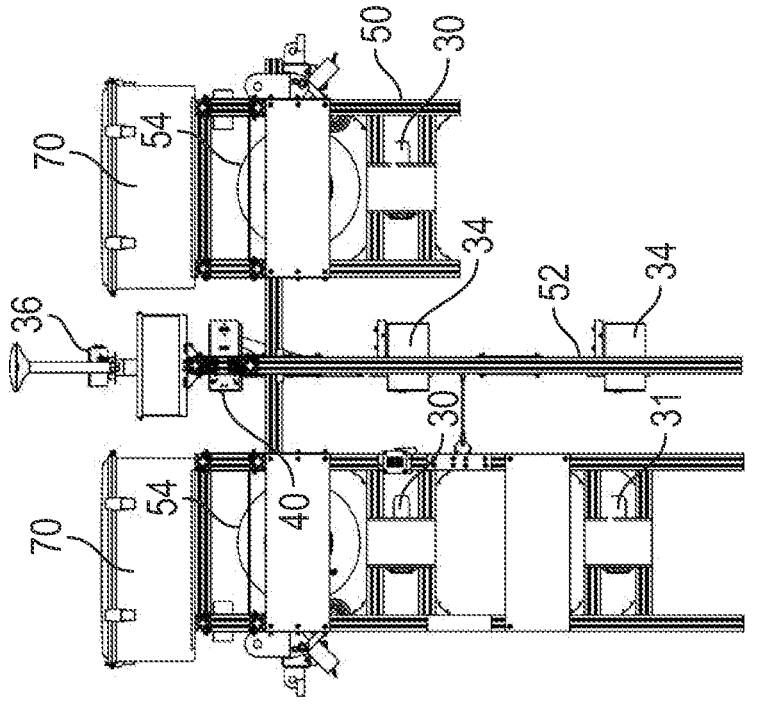
FIG. 15 is a side view of the second embodiment of the present invention.
Figure 18:
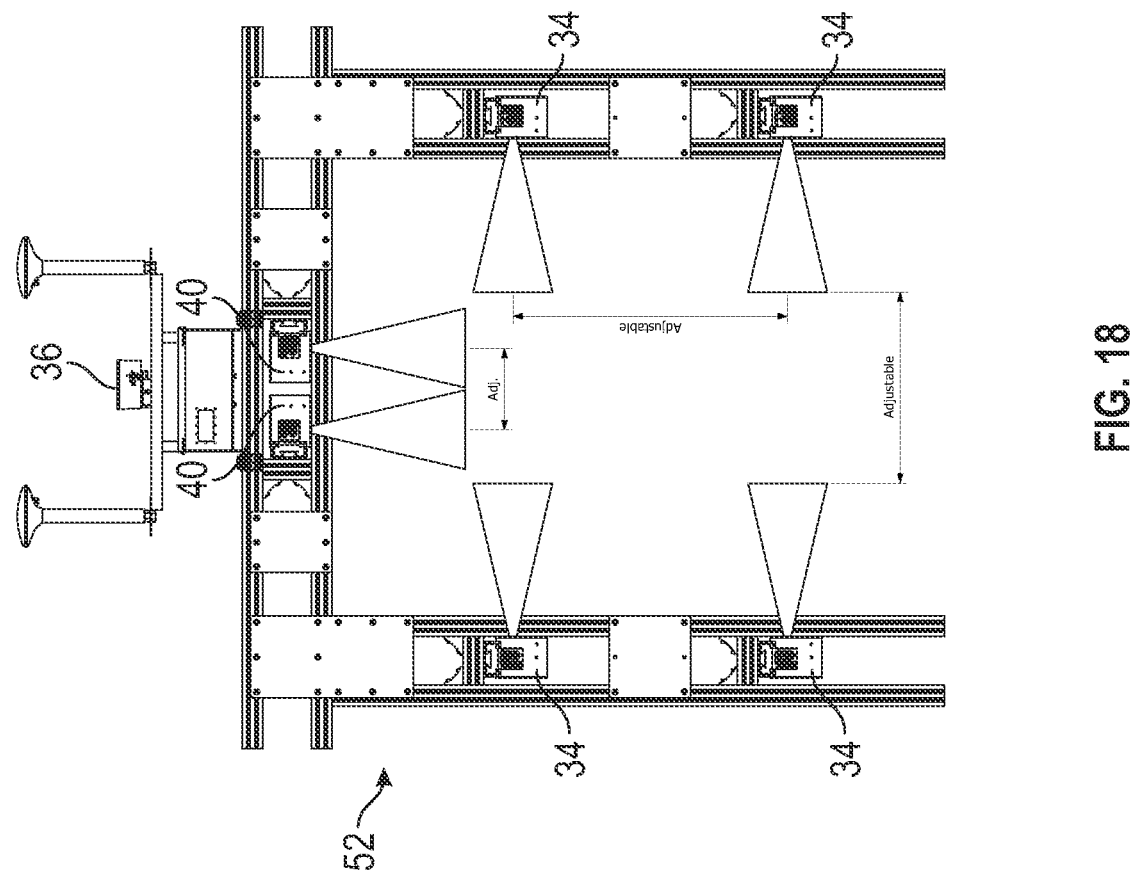
FIG. 18 is a front view of the instrumentation structure of the second embodiment of the present invention.
Figure 17:
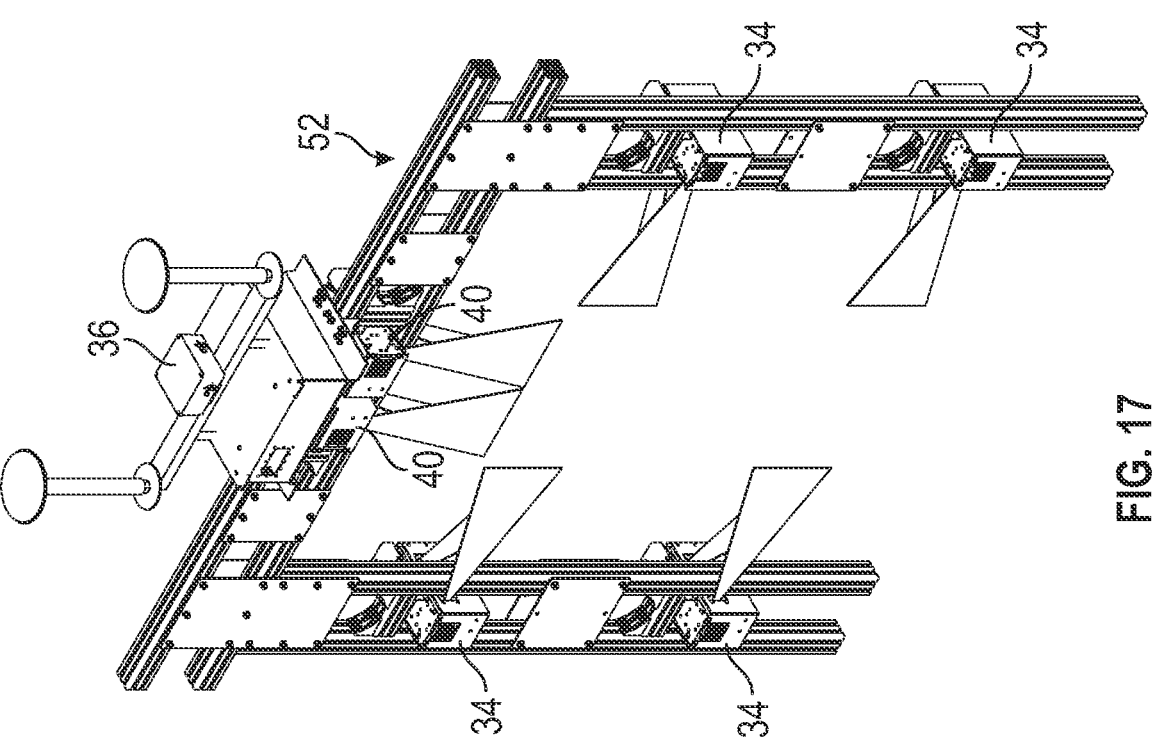
FIG. 17 is a perspective view of the instrumentation structure of the second embodiment of the present invention.

As best illustrated in FIGS. 11 and 12, the BMD 20' may comprise a self-powered trolley, generally designated 50, and an instrumentation structure 52 suspended from the trolley 50. The instrumentation structure 52 may carry the measuring instrumentation, including the IMU 36 and distance meters 34, 40. To accommodate beams of differing configurations, the position of the lasers 34 may be vertically adjusted and the lasers 40 may be horizontally adjusted. See, for example, FIG. 18.

The IMU 36 may include the inclinometer and accelerometer. The distance meters 34, 40 may preferably be in the form of laser-based devices, discussed above. The distance meters 34, 40 are illustrated including a triangular form, which form is to conceptually illustrate a range of accuracy for the distance meters 34, 40. The instrumentation structure 52 may be suspended from the trolley 50, in order to better isolate the measuring instrumentation located on the instrumentation structure 52 from vibration and other noise imposed on the trolley 50, as the trolley 50 traverses the beam.

For purposes of description, the BMD 20' may have a first trolley portion, generally designated 50a' and a second trolley portion, generally designated 50b'.

The trolley 50 may include two pair of opposed side rollers 30, one pair associated with a respective one of the first trolley portion 50a' and the second trolley portion 50b'. The trolley 50 may further include one pair of opposed guide, or stabilizing rollers 31, which may be disposed on the first trolley portion 50a', spaced below an associated pair of the opposed side rollers 30. The positions of the side rollers 30 and the stabilizing rollers 31 may be vertically and horizontally adjusted, to accommodate beams of varying dimensional configurations. See, for example, FIG. 13.

Figure 21:
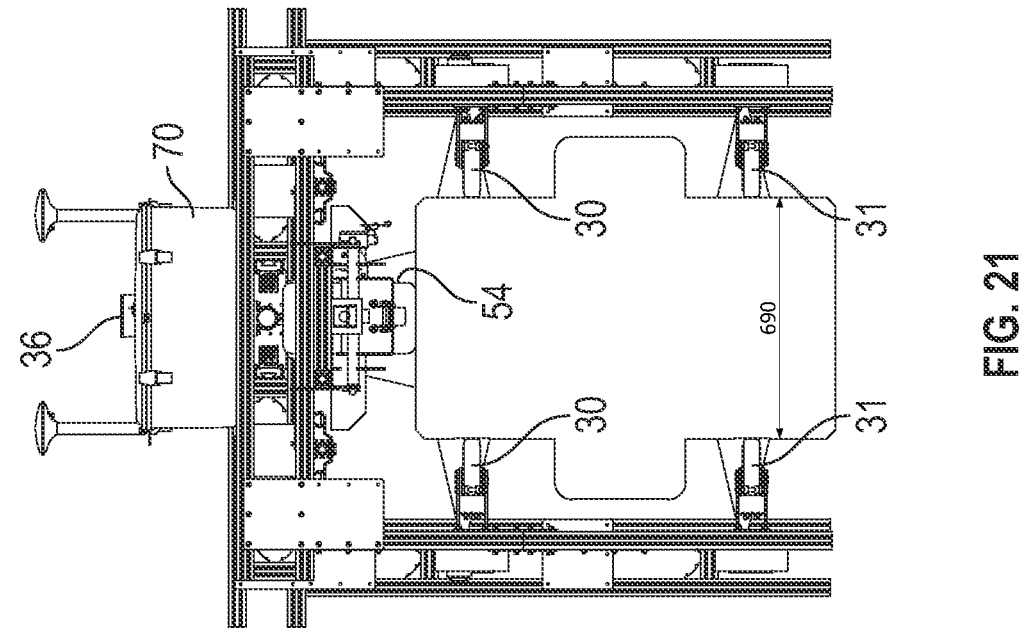
FIG. 21 is a front view of the second embodiment of the present invention, shown straddling the 690 mm wide monorail beam, such as utilized on the Cairo Monorail System.
Figure 20:
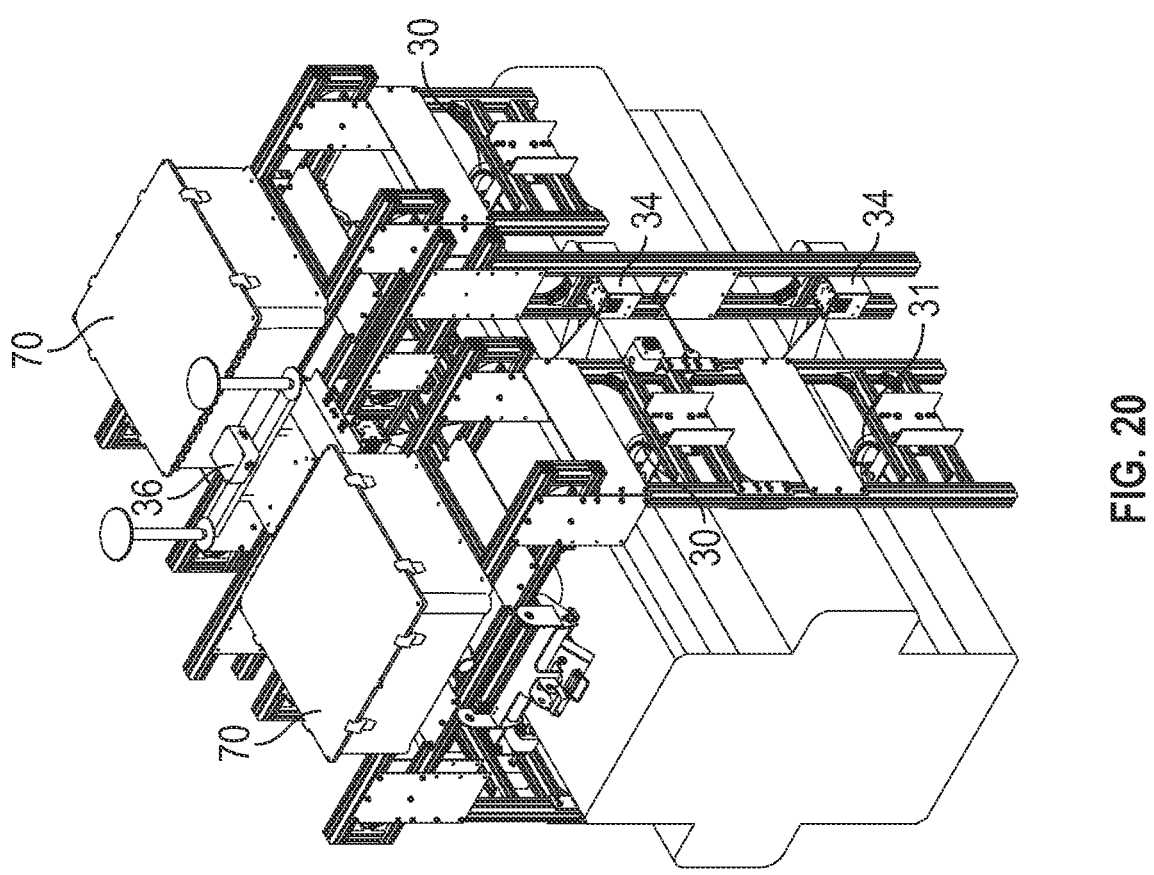
FIG. 20 is a perspective view of the second embodiment of the present invention, adjusted to straddle a 690 mm wide monorail beam, such as utilized on the Alstom Monorail System in Cairo, Egypt.
Figure 23:
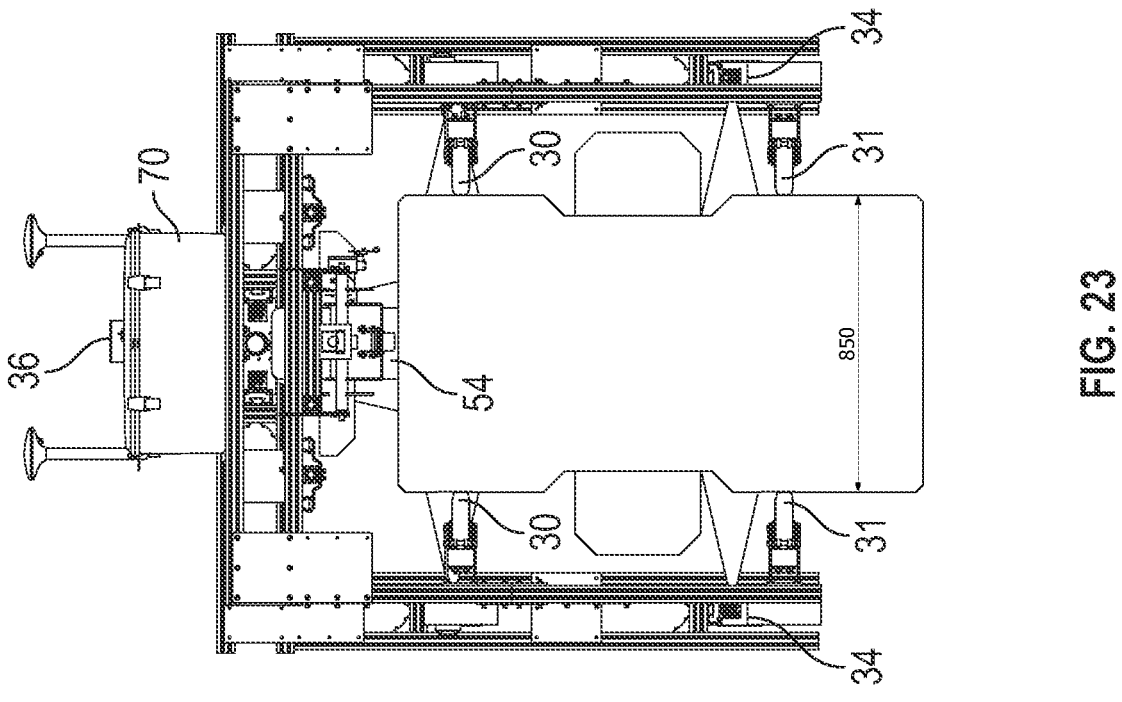
FIG. 23 is a front view of the second embodiment of the present invention, shown straddling the 850 mm wide monorail beam, such as utilized on the Hitachi Monorail System.
Figure 22:
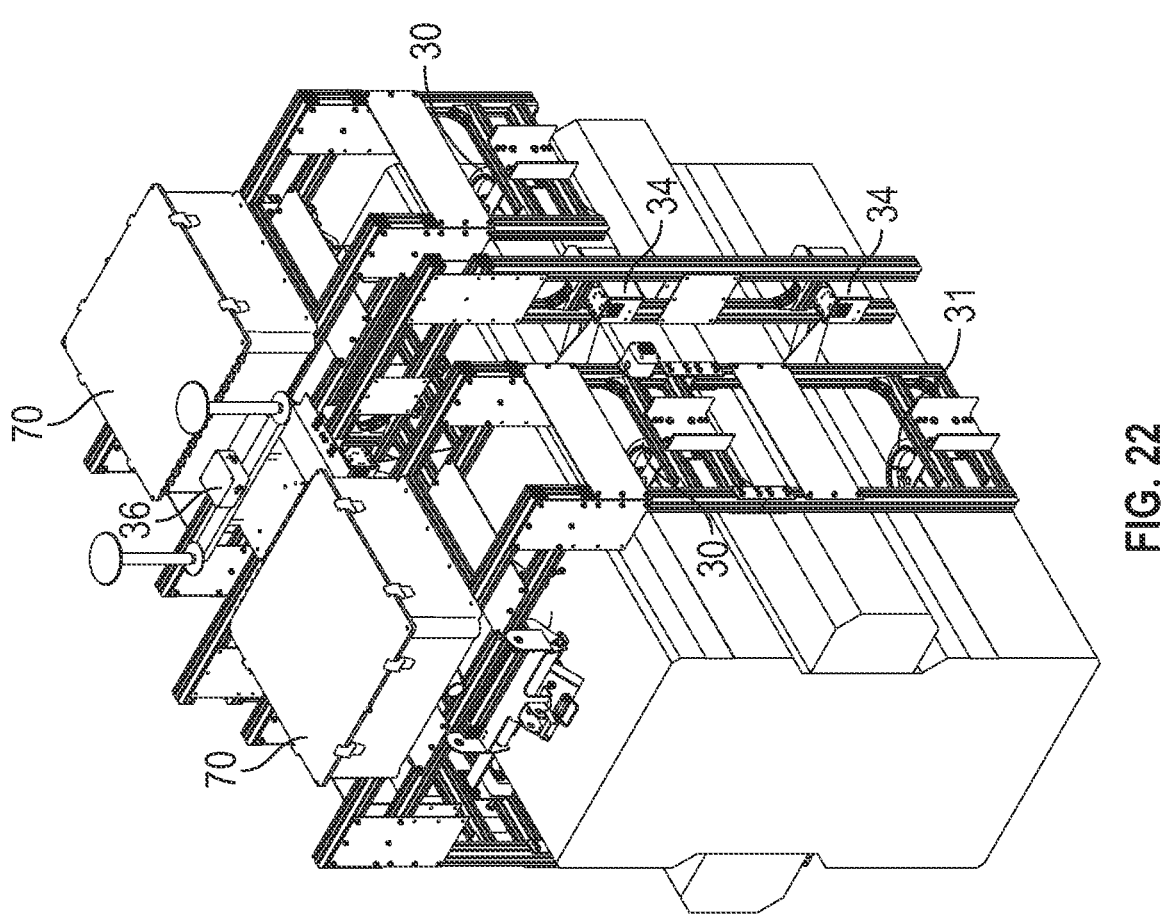
FIG. 22 is a perspective view of the second embodiment of the present invention, adjusted to straddle an 850 mm wide monorail beam, such as utilized on a Hitachi Monorail System.

The trolley 50 may be capable of operating on various straddle type guide beams. To accommodate various beam dimensions known in the industry, the positions of the side rollers 30 and the stabilizing rollers 31 may be adjustable, both vertically and horizontally. FIGS. 9-18 illustrate the BMD 20' adapted for the 660 mm wide beam of the Las Vegas Monorail, Las Vegas NV, USA. FIGS. 20-21 illustrate the BMD 20' adapted for the 690 mm wide beam of the Cairo Monorail, Cairo Egypt. FIGS. 22-23 illustrate the BMD 20' adapted for the 850 mm wide beam of the Hitachi Systems Monorail.

The trolley 50 may have at least two load tires 54 longitudinally displaced such that a loss of traction of one of the load tires 54 may be overcome by a second one of the load tires 54. Each of the load tires 54 may be driven by a respective electric traction motor 55, which motor 55 may be powered by a battery. The BMD 20' may include two encoders 55a, one associated with a respective one of the motors 55, and which may be mounted in-line with the respective motor 55 and associated one of the load tires 54.

The encoders 55a may provide positional feedback regarding the rotary position of the motor 55 and associated driven load tires 54.

The load tires 54 may be selected so that the contact patch and diameter of the load tires 54 are sufficiently large to negotiate expansion joints generally found along a typical straddle beam monorail guide beam. The preferred embodiment of the BMD 20' may have two upper load tires 54 permitting substantially equal loading of each if the load tires 54 and a substantially identical drive for each of the drive tires 54, simplifying design and optimizing use of their tire capacity.

As discussed above, the trolley 50 may further include side running, or guide, rollers 30 and stabilizing rollers 31, which may be selectively sized to substantially seamlessly negotiate typical side beam expansion joints found in the industry.

Specifically, the trolley 50 may have two pair of opposing guide rollers 30 to keep the trolley 50 aligned with the beam, one pair associated with the first trolley portion 50a' and the other pair associated with the second trolley portion 50b'. Each pair of the guide rollers 30 may be generally aligned to its respective, opposing guide roller 30.

To provide roll stability, the trolley 50 may include at least one pair of the opposing stabilizing rollers 31, which may be used in conjunction with the guide rollers 30. Preferably the pair of stabilizing rollers 31 may be aligned directly below one of the pair of guide rollers 30 to minimize unintended roll of the trolley 50 in a curve. Other embodiments might include three or more load tires 54, which in themselves may provide roll stability and may be combined with similar two pairs of guide rollers to provide more complete guidance control.

The trolley 50 may be designed to readily adjust to accommodate beams of various widths, and guide roller 30 positions and stabilizing roller 31 positions without having to replace items.

Guide roller stiffness and preload is important to maintain correct guidance of the trolley 50 along the beam, without causing excessive guide roller loads due to normal and out of tolerance beam variations. The transverse guide tire preload is preferably sufficient to overcome transverse creep forces caused by the load tires 54 while negotiating the sharpest curves. In addition, the guide tire preload force is preferably minimized when dealing with guide beam width variation including out of tolerance variations in order to minimize the structural strength requirement and weight impact on the trolley 50.

As identified above, the instrumentation structure 52, in the form of a separate frame member may preferably be mounted to the trolley 50. The instrumentation structure 52 may be in the form of an inverted U-frame, suitable to encompass the complete guide beam geometry, and is adapted to support the IMU 36.

The instrumentation structure 52 may preferably contain all measuring devices including distance measuring devices, surface texture measuring devices, accelerometers, inclinometers, antennas, and the like. This instrumentation structure 52 may be rigidly mounted to the trolley 50, or it may preferably be isolated from the trolley 50 of the BMD 20'.

Similar to the trolley 50, the instrumentation structure 52 may also be adjustable to accommodate various beam widths, and the beam surface measuring devices may be readily adjustable to align with all of the top and side running surfaces found in typical monorails.

As discussed above, the instrumentation structure 52 may be an independent structure that is intentionally designed to minimize any distortion from loads resulting from driving the trolley 50 and imposed loads from the guide and stabilizing rollers 30, 31, respectively, such that in this embodiment, preferably none of the guiding forces enter the instrumentation structure 52. These loads may be taken substantially completely by the trolley 50.

Figures 19A, 19B, 19C:
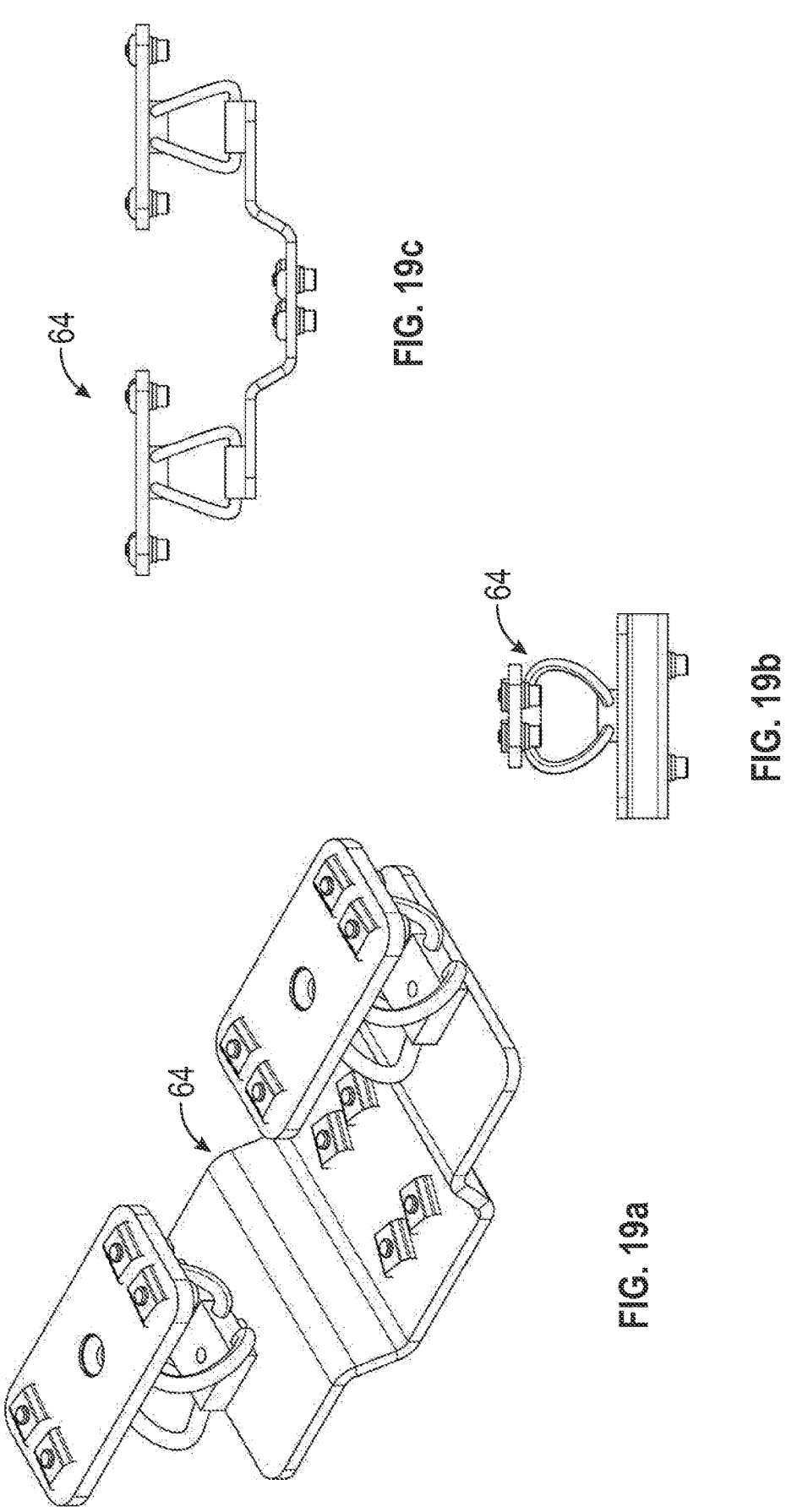
FIGS. 19a, 19b and 19c are respective perspective, side and front views of an example of an isolator for coupling the instrumentation structure to the trolley.

To provide the added isolation, and referring to FIGS. 19a, 19b and 19c, at least two (four in the instant embodiment) isolators 64 may be provided to connect the instrumentation structure 52 to the trolley 50, above the center of gravity of the instrumentation structure 52 and laterally displaced from each other to provide independent vertical and roll stability. Pitch stability of the instrumentation structure 52 may be independently provided by the longitudinal stiffness of the isolators 64 in conjunction with traction links 66 connected to the trolley 50, vertically displaced below the supporting isolators 64, and optimally at the same elevation as the center of gravity of the fully assembled instrumentation structure 52. The traction links 66, in line with the center of gravity of the assembled instrumentation structure 52, may minimize any pitching moment due to longitudinal acceleration, i.e., they keep the instrumentation structure 52 from rocking as the trolley 50 traverses the beam.

The BMD 20' disclosed herein is preferably focused on a straddle beam monorail but may also be applied to other beam geometries for other types of monorails.

The BMD 20' may preferably be self-powered with autonomous capabilities but may also be manually operated. The trolley 50 may include energy storage, such as batteries, remote access device controllers, drive line controllers, drive line devices, encoders, safety devices such as obstacle detection devices and emergency shut down devices, and devices with recovery capabilities, which devices may be located in housings 70 carried by the trolley 50.

In the present embodiment, it is preferred to support the total weight of the BMD 20' with two of the load tires 54. It is also preferred to minimize any natural frequency vibration, to provide maximum isolation of the instrumentation structure 52 from beam anomalies. It is further preferred to have sufficient tire contact patch size of the load tires 54 to negotiate gaps in expansion joints without losing contact on horizontal surfaces. Accordingly, for the present embodiment, the load tires may have a diameter of the order of 15 inches, a width of the order of 6.5 inches, and an inflation pressure of the order of 14 psi. The guide and stabilizing rollers 30, 31 may have a diameter of the order of eight inches and a width of the order of two inches. The effective tire stiffness, using McMaster-Carr: 9573K35 springs, of the guide tires 30 and the stabilizing tires 31 are of the order of 400.8 lbs/in, and the effective tire capacity of the guide tires 30 and the stabilizing tires 31, using a McMaster-Carr: 9573K35 springs, are of the order of 400 lbs. The preload per guide tire 30 and stabilizing tire 31 may preferably be of the order of 50 lbs (3 mm deflection) to accommodate as much as 6 mm narrower beams.

Capacity of the guide tires 30 is preferably sufficient to ensure the load tires 54 remain centered on the beam while negotiating curves assuming transverse creep coefficient of 1.0. This translates to a horizontal force per load tire of up to 350 lbs, based on a maximum BMD weight of 700 lbs.

The isolators 64 may be wire rope isolators, which may provide both isolation and damping. The isolators 64 may be selected to minimize natural frequency vibrations, while also being able to support the weight of a fully assembled instrumentation structure 52 and to dampen undesirable oscillations. The four isolators 64 may be an SM7-185-A, which may be obtained from Isolation Dynamics Corp., of Farmingdale, NY. These isolators 64 may each have a stiffness of 82 lbs/in, providing an effective stiffness of 82×4=328 lbs/in. The dimensions of the isolators 64 may be 1.85"×2.55"×3.30". The mass of the isolation structure 52 may be of the order of 66.5 kg, having a natural frequency of the order of 4.7 Hz.

It is to be understood that this disclosure is not intended to limit the invention to any particular embodiments described herein, but to the contrary, the invention is intended to include all modifications, alternatives and equivalents falling within the spirit and scope of the invention.

We claim:

1. A beam measuring frame for a monorail guide beam adapted to support a straddle beam monorail car traveling a distance along the monorail guide beam, the guide beam having a generally horizontal upper surface and two opposed, generally vertical side surfaces, the guide beam having a preferred width between the side surfaces along the distance, the beam measuring frame for measuring an actual width between the side surfaces of the monorail guide beam along the distance, comprising:

a trolley adapted to traverse along the monorail guide beam; and a separate instrumentation structure from the trolley, the instrumentation structure having measuring instrumentation for receiving beam measurements, wherein the instrumentation structure is coupled to and substantially physically isolated from the trolley and vibration induced on the trolley by the beam as the trolley and the instrumentation structure traverse the monorail guide beam.

2. The beam measuring frame of claim 1, wherein the trolley is self-powered.

3. The beam measuring frame of claim 1, including an isolator for coupling the instrumentation structure to the trolley.

4. The beam measuring frame of claim 3, wherein the isolator comprises a wire rope isolator.

5. The beam measuring frame of claim 1, wherein the frame includes at least two pneumatic load tires adapted to engage the horizontal upper surface of the beam.

6. The beam measuring frame of claim 5, wherein the pneumatic load tires are inflated to a pressure of the order of 14 psi.

7. The beam measuring frame of claim 6, wherein the load tires have a diameter of the order of 15", and a width of the order of 6".

8. The beam measuring frame of claim 5, wherein the trolley includes at least two sets of opposing guide rollers and at least one set of opposing stabilizing rollers, wherein the at least one set of stabilizing rollers is disposed below one set of the opposing guide rollers.

9. The beam measuring frame of claim 8, wherein at least one of each of the pairs of guide and stabilizing rollers is one of a spring loaded or low inflated pneumatic tire.

10. The beam measuring frame of claim 1, wherein the measuring instrumentation includes a plurality of laser-based distance measuring devices for measuring vertical and horizontal distances to the beam.

11. The beam measuring frame of claim 1, wherein the measuring instrumentation further includes a tri-axial inclinometer and a tri-axial accelerometer.

12. The beam measuring frame of claim 11, including an inertial measuring unit for collecting and processing measurement data from the distance measuring devices, inclinometer, and accelerometer.

13. The beam measuring frame of claim 12 including an inertial navigation system for providing geographical positioning data regarding the geographical position of the processed measurement data relative to the beam.

14. A beam measuring frame for a monorail guide beam adapted to support a monorail car traveling a distance along the monorail guide beam, the guide beam having a generally horizontal upper surface and two opposed, generally vertical side surfaces, the guide beam having a preferred width between the side surfaces along the distance, the beam measuring frame for measuring an actual width between the side surfaces of the monorail guide beam along the distance, comprising:

a trolley adapted to traverse along the monorail guide beam, wherein the trolley includes at least two motor-powered, low-pressure pneumatic load tires adapted to drivingly engage the horizontal upper surface of the beam, and at least two sets of opposing guide rollers and at least one set of opposing stabilizing rollers, wherein the at least one set of stabilizing rollers is disposed below one set of the opposing guide rollers, and wherein at least one of each of the pairs of guide and stabilizing rollers is a low-pressure pneumatic tire; and a separate instrumentation structure from the trolley, the instrumentation structure having measuring instrumentation for receiving beam measurements, wherein the instrumentation structure is coupled to and substantially isolated from the trolley and vibration induced on the trolley by the beam as the trolley and the instrumentation structure traverse the monorail guide beam, wherein the measuring instrumentation includes a plurality of laser-based distance measuring devices for measuring vertical and horizontal distances to the beam.

15. The beam measuring frame of claim 14, including a wire-rope isolator for coupling the instrumentation structure to the trolley.

16. The beam measuring frame of claim 14, wherein the pneumatic load tires are inflated to a pressure of the order of 14 psi.

17. The beam measuring frame of claim 16, wherein the load tires have a diameter of the order of 15", and a width of the order of 6".

18. The beam measuring frame of claim 14, wherein the measuring instrumentation further includes a tri-axial inclinometer and a tri-axial accelerometer.

19. The beam measuring frame of claim 18, including an inertial measuring unit for collecting and processing measurement data from the measurement instrumentation.

20. The beam measuring frame of claim 19 including an inertial navigation system for providing geographical positioning data regarding the geographical position of the processed measurement data relative to the beam.

* * * * *